(12) United States Patent
Hunger

(10) Patent No.: US 10,505,373 B2
(45) Date of Patent: Dec. 10, 2019

(54) SWITCHABLE INTERFACE FOR CHARGERS

(71) Applicant: Hilti Aktiengesellschaft, Schaan (LI)

(72) Inventor: Markus Hunger, Augsburg (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 15/535,510

(22) PCT Filed: Dec. 17, 2015

(86) PCT No.: PCT/EP2015/080141
§ 371 (c)(1),
(2) Date: Jun. 13, 2017

(87) PCT Pub. No.: WO2016/097086
PCT Pub. Date: Jun. 23, 2016

(65) Prior Publication Data
US 2017/0346302 A1    Nov. 30, 2017

(30) Foreign Application Priority Data

Dec. 18, 2014 (EP) ..................... 14198767

(51) Int. Cl.
*H02J 7/00* (2006.01)
*H02J 7/04* (2006.01)

(52) U.S. Cl.
CPC ............ *H02J 7/0003* (2013.01); *H02J 7/008* (2013.01); *H02J 7/0024* (2013.01); *H02J 7/0045* (2013.01); *H02J 7/042* (2013.01)

(58) Field of Classification Search
CPC ......... H02J 7/0003; H02J 7/008; H02J 7/0024
USPC ......................................... 320/110, 113, 119
See application file for complete search history.

(56) References Cited

U.S. PATENT DOCUMENTS

| | | | | |
|---|---|---|---|---|
| 6,268,709 | B1* | 7/2001 | Lee ................. | H02J 7/0042 320/112 |
| 2004/0130289 | A1* | 7/2004 | Lam ................. | H02J 7/0013 320/107 |
| 2007/0120524 | A1 | 5/2007 | Shum | |
| 2008/0067975 | A1 | 3/2008 | Law | |
| 2010/0277122 | A1* | 11/2010 | Yang ................. | H02J 7/0003 320/110 |
| 2011/0234160 | A1 | 9/2011 | Smith | |

(Continued)

OTHER PUBLICATIONS

International Search Report of PCT/EP2015/080141, dated Feb. 22, 2016, 2 pages.

*Primary Examiner* — Edward Tso
*Assistant Examiner* — Aaron Piggush
(74) *Attorney, Agent, or Firm* — Davidson, Davidson & Kappel, LLC

(57) ABSTRACT

Disclosed is a charger for charging a rechargeable battery, comprising a control device and at least one electromechanical interface device for connecting at least one rechargeable battery to the charger and supplying a voltage to said battery. The interface device comprises at least a first terminal and a second terminal and can be set to at least one first position and to a second position; the first terminal can be used for charging a first rechargeable battery when the interface is in the first position, and the second terminal can be used for charging a second rechargeable battery when the interface is in the second position.

18 Claims, 12 Drawing Sheets

(56) References Cited

U.S. PATENT DOCUMENTS

2015/0024625 A1* 1/2015 Hsieh .................... H01R 33/90
                                                439/540.1
2015/0194819 A1* 7/2015 Wohltmann ........ H01L 25/0655
                                                320/113

* cited by examiner

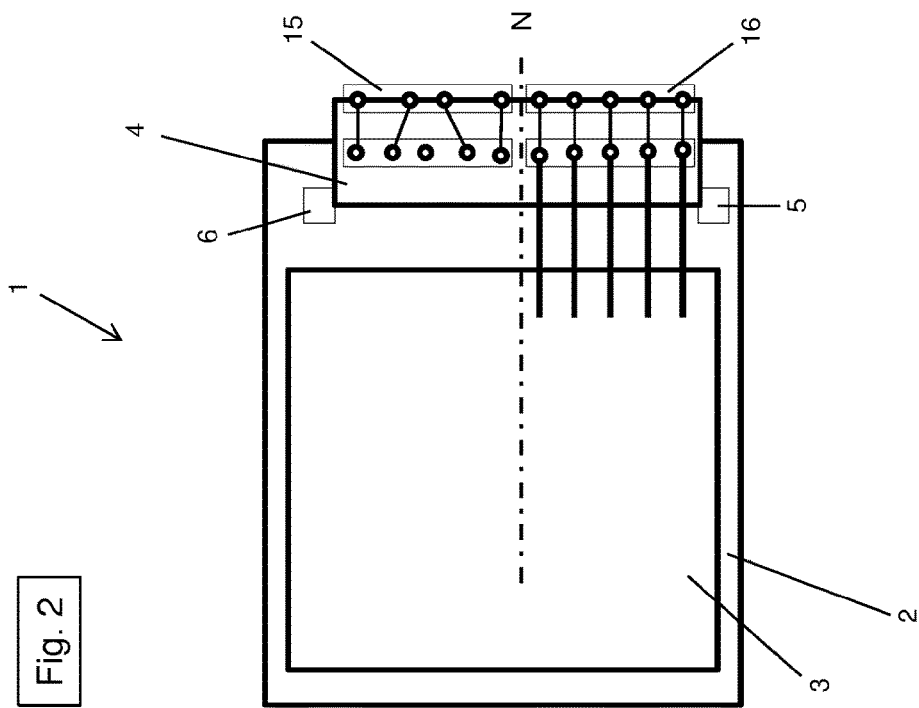
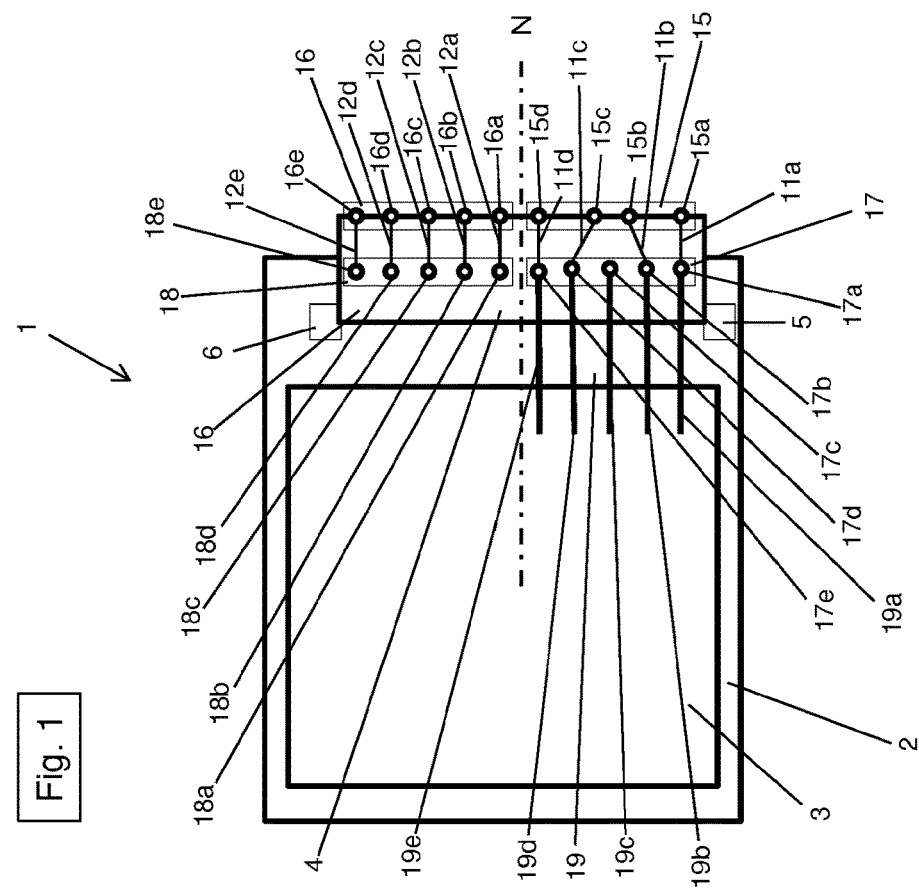

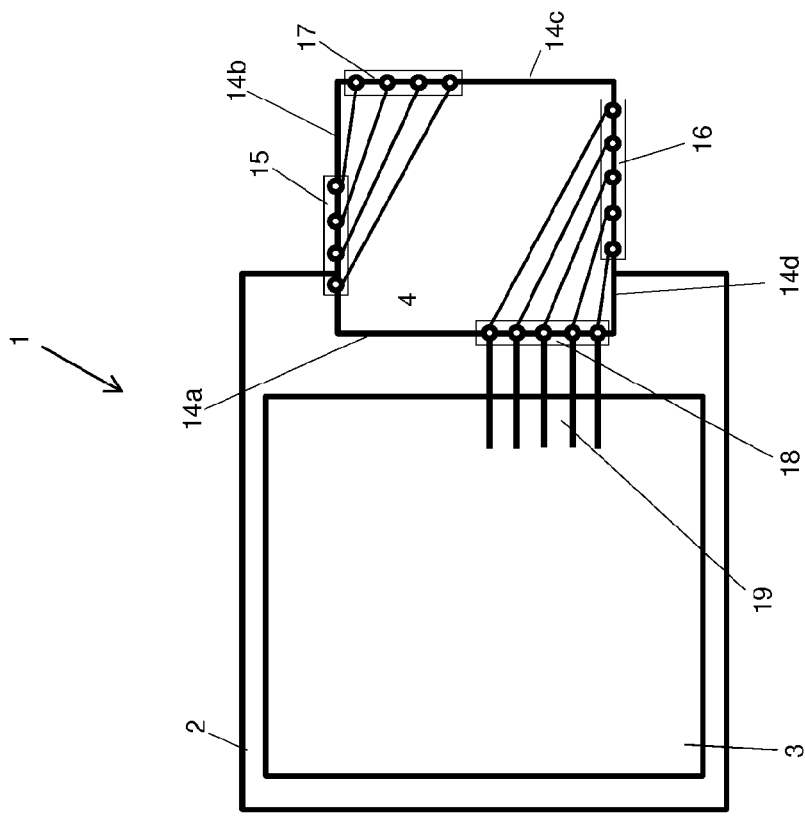
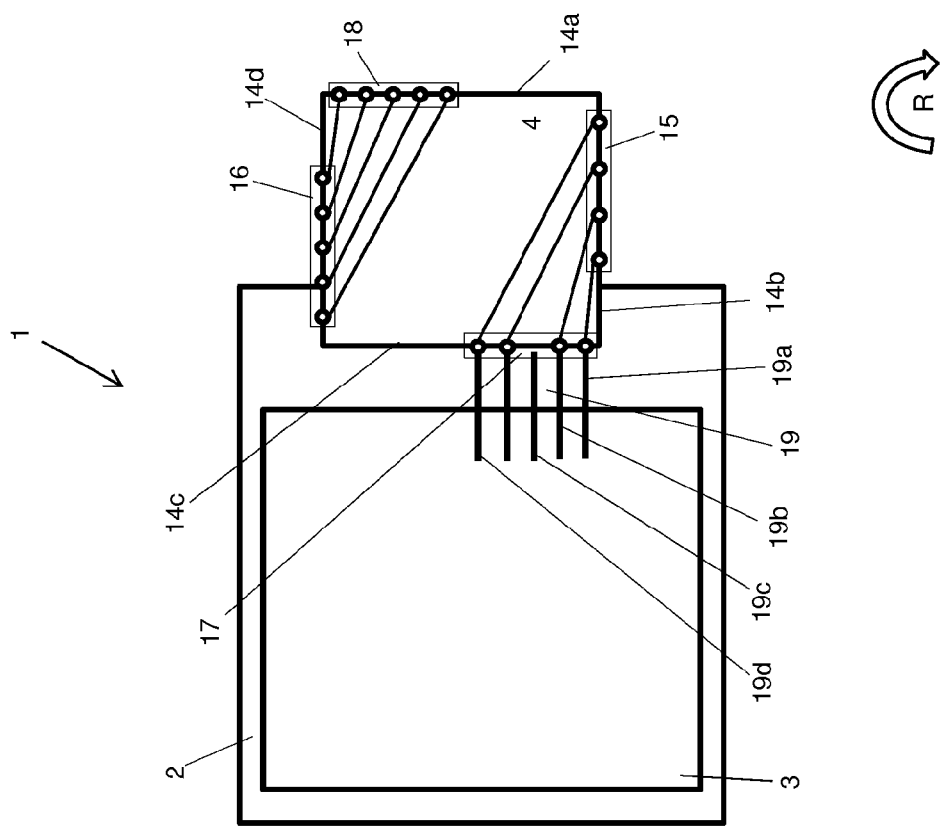

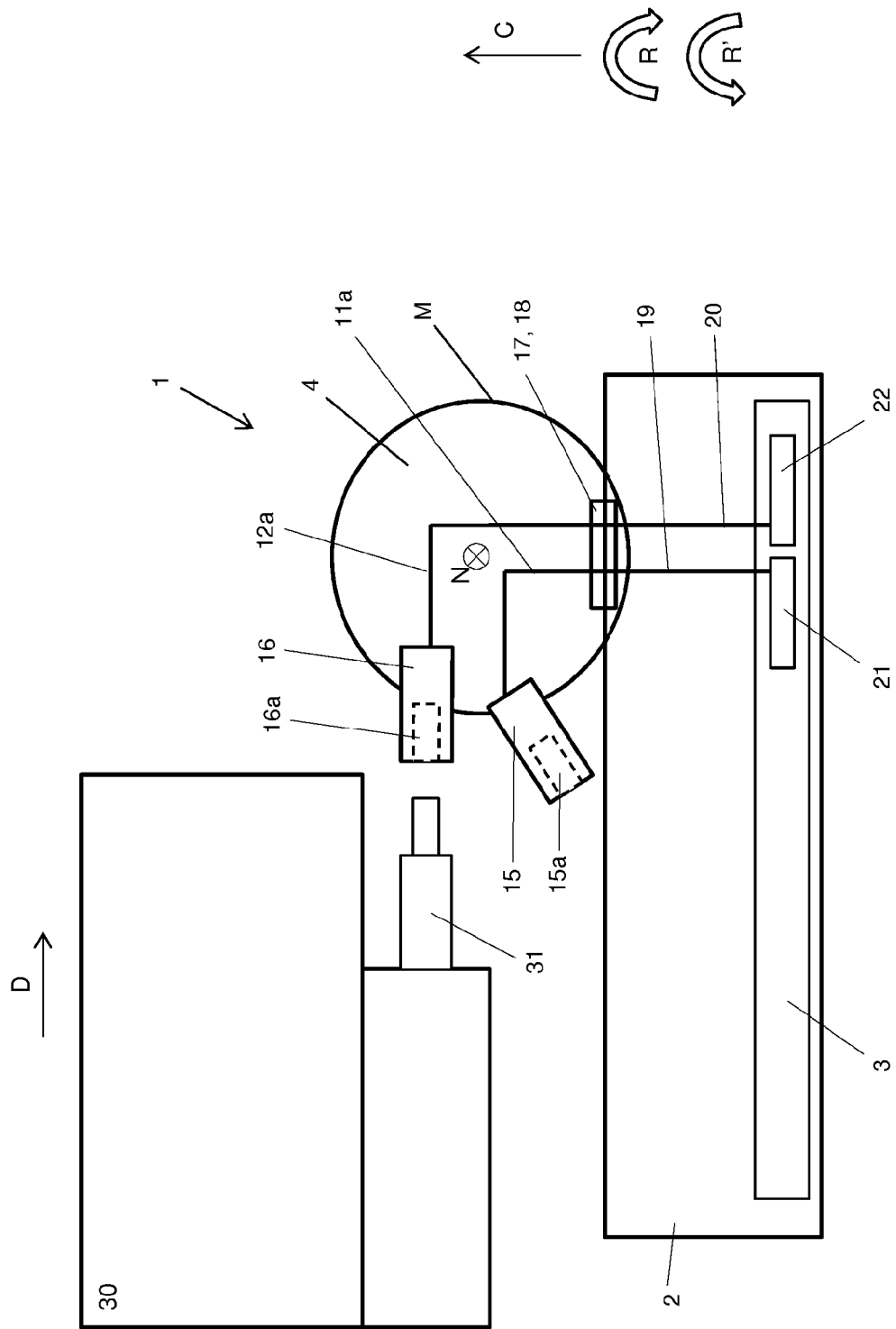

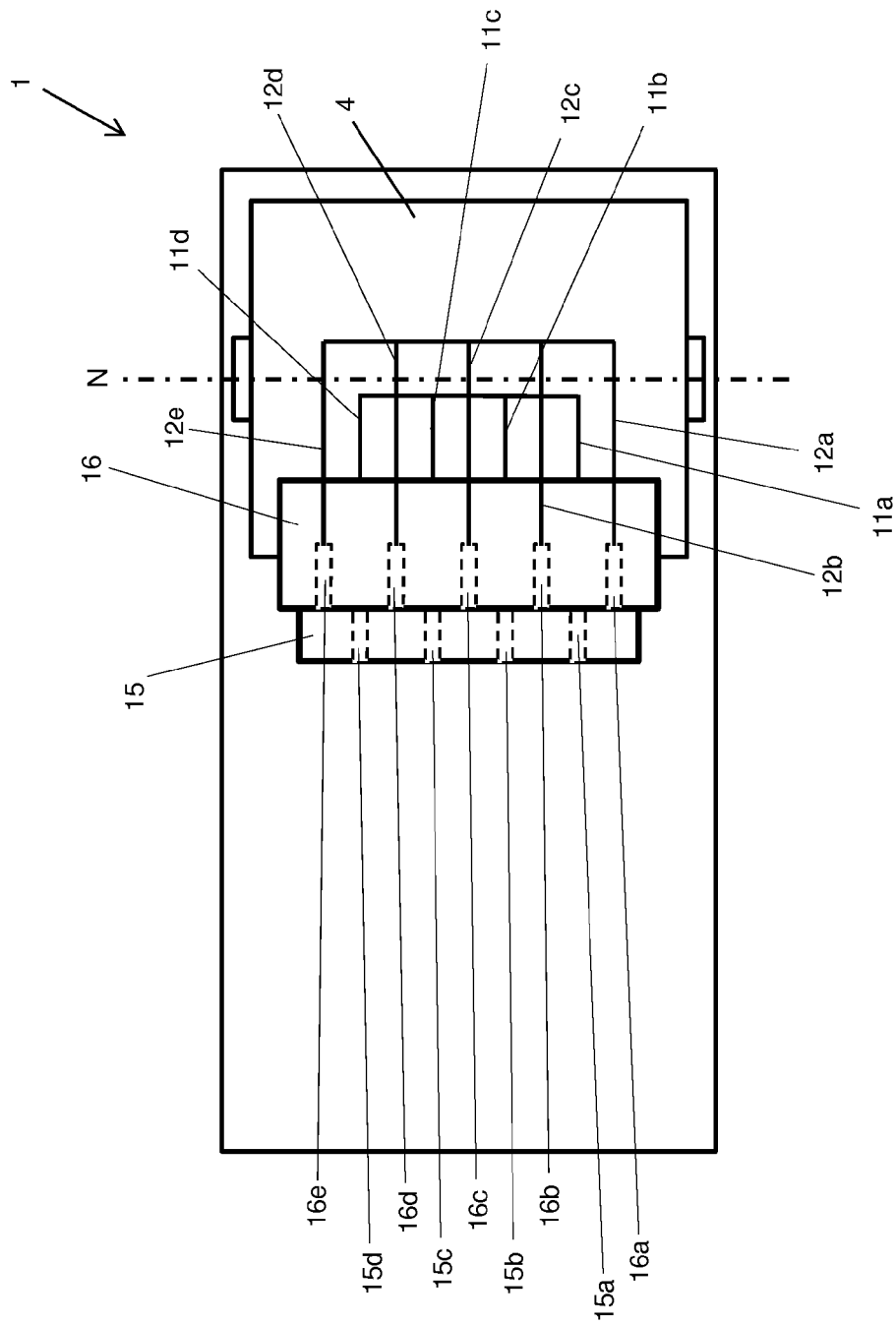

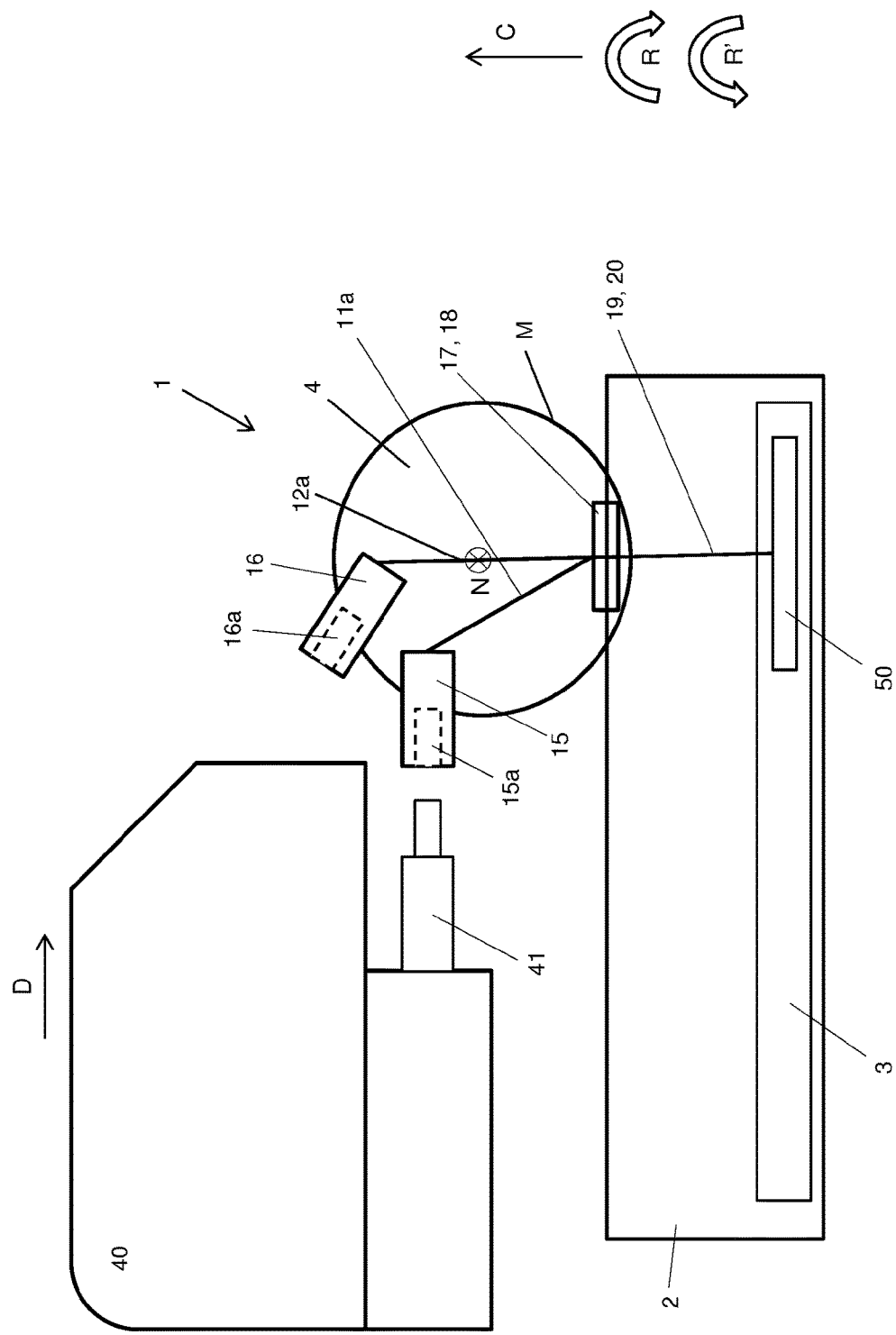

SWITCHABLE INTERFACE FOR CHARGERS

The present invention relates to a charging device for charging at least one rechargeable battery, containing at least one electromechanical interface device for connecting at least one rechargeable battery to the charging device and for supplying the rechargeable battery with a voltage, and a control device.

BACKGROUND

Electric machine tools such as drill hammers, circular saws, angle grinders, or the like are often supplied with voltage with the aid of a rechargeable battery. The rechargeable batteries are generally configured in such a way that they may be connected to the machine tool and also detached again. The detachable connection between the rechargeable battery and the machine tool is used, among other things, to recharge a rechargeable battery, which has become depleted due to use of the machine tool, with voltage via a rechargeable battery charging device (also referred to as a rechargeable battery charger, or charger). After the rechargeable battery has been returned to a charged state with the aid of the charger, the rechargeable battery may be reconnected to the machine tool in order to once again supply it with voltage. The rechargeable battery undergoes high stress due to continued use and in particular due to frequent charging, so that after a certain period of time it no longer has its original capacity. Regularly replacing a highly stressed rechargeable battery with a new, more powerful battery is not an uncommon measure. However, since the machine tool and the charger do not necessarily also have to be replaced along with the rechargeable battery, the problem often arises that the new rechargeable battery is not identical to the old, i.e., original, rechargeable battery. As the result of development measures, it is possible that the new rechargeable battery includes a new electromechanical interface device which, although it is compatible with the machine tool, is incompatible with the original charger.

In addition, it is possible that, as the result of such development measures for the rechargeable battery charger, a new charger that is intended to replace the original charger due to signs of wear is not compatible with an older rechargeable battery.

This may result in an incompatibility problem between the rechargeable battery and the charger.

SUMMARY OF THE INVENTION

It is an object of the present invention to provide a charging device for charging a rechargeable battery, with which the compatibility between the rechargeable battery and the charger may be improved.

A charging device for charging at least one rechargeable battery is provided, containing a control device and at least one electromechanical interface device for connecting at least one rechargeable battery to the charger and for supplying the rechargeable battery with a voltage.

According to the present invention, it is provided that the interface device contains at least one first terminal point and one second terminal point, and the interface device is settable in at least one first position and one second position, the first terminal point being usable for charging a first rechargeable battery when the interface is set in the first position, and the second terminal point being usable for charging a second rechargeable battery when the interface is set in the second position. Thus, depending on the setting of the interface device, various types of rechargeable batteries may be charged by one charger, and consequently the compatibility between the rechargeable battery and the charger may be improved.

According to another advantageous specific embodiment of the present invention, it may be possible for the first terminal point to contain a first number of terminal elements and the second terminal point to contain a second number of terminal elements, the first number of terminal elements corresponding to the number of contact elements of the first rechargeable battery, and the second number of terminal elements corresponding to the number of contact elements of the second rechargeable battery. The user of the charging device is thus shown, in a simple manner, at which terminal point of the interface device the rechargeable battery in question is to be connected.

To ensure in a simple manner that a charging operation for an appropriately connected rechargeable battery is correctly carried out, according to another advantageous specific embodiment of the present invention it may be possible to select a first charging configuration for charging the first rechargeable battery when the interface device is set in the first position and the first rechargeable battery is connected to the first terminal point, and to select a second charging configuration for charging the second rechargeable battery when the interface device is set in the second position and the second rechargeable battery is connected to the second terminal point.

According to another advantageous specific embodiment of the present invention, it may be possible for the interface device to contain a connection point with a number of connecting elements for connecting the interface device to the control device, the number of connecting elements corresponding to the larger number of terminal elements of the first or second terminal point. It may thus be ensured that the first terminal point is connectable to the connection point via a first number of terminal elements, and that the second terminal point is connectable to the connection point via a second number of terminal elements.

According to another advantageous specific embodiment of the present invention, it may be possible for the interface device to contain a first connection point and a second connection point for connecting the interface device to the control device, the first connection point containing a first number of connecting elements and the second connection point containing a second number of connecting elements, the first number of connecting elements corresponding to the first number of terminal elements, and the second number of connecting elements corresponding to the second number of terminal elements. Due to using a first and second connection point, it is possible to use an electronics system having a relatively simple design for controlling the charging device, since, based on the particular connection of the first or second terminal point to the associated first or second connection point, there is already an unambiguous determination of the first or second position of the interface device, i.e., of the first or second rechargeable battery. The electronics system used for controlling the charging device may therefore be designed without a device for recognizing the first or second position of the interface device or for recognizing the particular first or second rechargeable battery connected to the interface device.

According to another advantageous specific embodiment of the present invention, it may be possible for the first or second position of the interface device, and/or the first or second rechargeable battery, which is connected to the interface device, to be recognizable based on the number of connections between terminal elements and connecting elements. The recognition of the first or second position of the interface device, or the recognition of the particular first or second rechargeable battery connected to the interface device, may thus have a simple design.

According to another advantageous specific embodiment of the present invention, it may be possible for at least one terminal element of the first terminal point and at least one terminal element of the second terminal point to be designed at least for receiving information concerning the first rechargeable battery and the second rechargeable battery at the charging device, so that, depending on the particular first or second rechargeable battery that is connected, a first charging configuration is settable for charging the first rechargeable battery, or a second charging configuration is settable for charging the second rechargeable battery. The particular rechargeable battery that is connected is thus easily capable of setting the particular appropriate charging configuration in the charger.

To ensure preferably simple and reliable recognition of the interface device in the first or second position for the charger, according to another advantageous specific embodiment of the present invention it may be possible to provide at least one microswitch for recognizing whether the interface device is set in the first position or in the second position. The microswitch may be positioned, for example, between the interface device and a housing of the charging device.

Further advantages result from the following description of the figures. Various exemplary embodiments of the present invention are illustrated in the figures. The figures and the description contain numerous features in combination. Those skilled in the art will also advantageously consider the features individually and combine them into further meaningful combinations.

BRIEF DESCRIPTION OF THE DRAWINGS

Similar and identical components are denoted by the same reference numerals in the figures.

FIG. 1 shows a schematic view of a charging device according to the present invention according to a first specific embodiment, with an interface device in a first position;

FIG. 2 shows a schematic view of the charging device according to the present invention according to the first specific embodiment, with the interface device in a second position;

FIG. 9 shows a schematic view of the charging device according to the present invention according to a fifth specific embodiment, with the interface device in a first position;

FIG. 10 shows a schematic view of the charging device according to the present invention according to the fifth specific embodiment, with the interface device in a second position;

FIG. 13 shows a side view of the charging device according to the present invention according to a seventh specific embodiment, with the interface device in a first position, and a first rechargeable battery;

FIG. 14 shows a top view onto the charging device according to the present invention according to the seventh specific embodiment, with the interface device in a first position;

FIG. 18 shows a side view of the charging device according to the present invention according to the eighth specific embodiment, with the interface device in a second position, and a second rechargeable battery.

DETAILED DESCRIPTION

Figure 4:
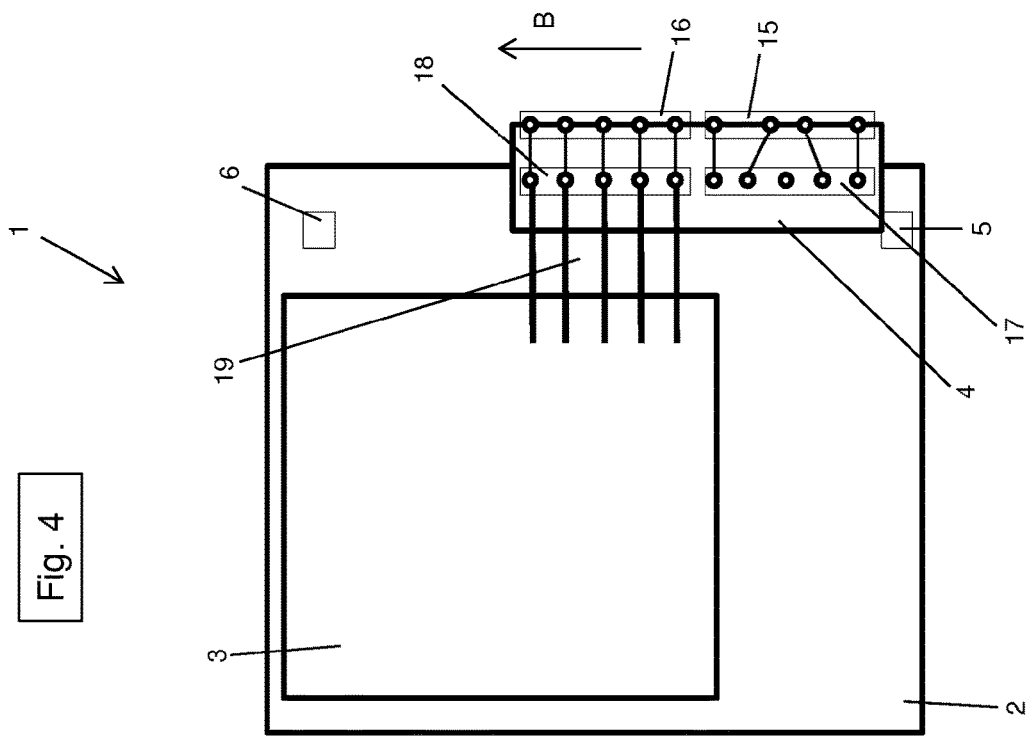
FIG. 4 shows a schematic view of the charging device according to the present invention according to the second specific embodiment, with the interface device in a second position.

FIGS. 1 and 2 show a charging device 1 according to the present invention for charging at least one rechargeable battery according to a first specific embodiment.

Charging device 1 essentially contains a housing 2, a control device 3, an interface device 4, a first microswitch 5, a second microswitch 6, and a power supply. The power supply is designed in the form of a power cable which may be connected to a power source (power socket). The power supply is not illustrated in the figures.

Control device 3 is positioned in housing 2. An electronics system for controlling and regulating charging device 1, and in particular for controlling and regulating the charging operation for a rechargeable battery connected to charging device 1, is stored on control device 3. Control device 3 has a first charging configuration for charging a first rechargeable battery, and a second charging configuration for charging a second rechargeable battery. Control device 3 is designed in such a way that the first charging configuration is automatically selected and set when charging device 1 recognizes that the first rechargeable battery is connected to interface device 4. In addition, the second charging configuration is selected and set when the charging device recognizes that the second rechargeable battery is connected to interface device 4.

For this purpose, interface device 4 is used for connecting at least one rechargeable battery to charging device 1. Interface device 4 is designed in such a way that voltage, information, and data may be bidirectionally exchanged between charging device 1 and the particular rechargeable battery that is connected.

Interface device 4 contains a first terminal point 15 and a second terminal point 16. First terminal point 15 contains four terminal elements 15a, 15b, 15c, 15d and five connecting elements 17a, 17b, 17c, 17d, 17e. Second terminal point 16 contains five terminal elements 16a, 16b, 16c, 16d, 16e and five connecting elements 18a, 18b, 18c, 18d, 18e. In first terminal point 15, the four terminal elements 15a, 15b, 15c, 15d are connected to the five connecting elements 17a, 17b, 17c, 17d, 17e via four connecting lines 11a, 11b, 11c, 11d. In second terminal point 16, the five terminal elements 16a, 16b, 16c, 16d, 16e are connected to the five connecting elements 18a, 18b, 18c, 18d, 18e via five connecting lines 12a, 12b, 12c, 12d, 12e.

In first terminal point 15, the four terminal elements 15a, 15b, 15c, 15d are connected to the five connecting elements 17a, 17b, 17c, 17d, 17e in such a way that one connecting element 17c is not connected to one of the four connecting elements 15a, 15b, 15c, 15d. Terminal elements 15a, 15b, 15c, 15d of first terminal point 15 are used for connection to the contact elements of a first rechargeable battery. Terminal elements 16a, 16b, 16c, 16d, 16e of second terminal point 16 are used for connection to the contact elements of a second rechargeable battery. It is thus provided that a first rechargeable battery is connectable to first terminal point 15, and a second rechargeable battery is connectable to second terminal point 16. Neither the first nor the second rechargeable battery is shown in FIGS. 1 through 12.

According to the first specific embodiment of charging device 1, control device 3 contains a connection device 19 with five connecting lines 19a, 19b, 19c, 19d, 19e, via which the five connecting elements 17a, 17b, 17c, 17d, 17e of first terminal point 15, or the five connecting elements 18a, 18b, 18c, 18d, 18e of second terminal point 16, may be connected to control device 3.

As illustrated in FIGS. 1 and 2, charging device 1 according to the first specific embodiment is designed in such a way that interface device 4 is settable in a first position or in a second position. Interface device 4 is in the first position in FIG. 1, and interface device 4 is in the second position in FIG. 2.

As shown in FIG. 1, interface device 4 in the first position is configured in such a way that the five connecting elements 17a, 17b, 17c, 17d, 17e of first terminal point 15 are connected to the five connecting lines 19a, 19b, 19c, 19d, 19e of control device 3. Thus, in the first position of interface device 4, within first terminal point 15 there is a connection of the four terminal elements 15a, 15b, 15c, 15d to control device 3 via four of the five connecting elements 17a, 17b, 17d, 17e, so that a rechargeable battery connected to the four terminal elements 15a, 15b, 15c, 15d may be supplied with voltage via control device 3.

To bring interface device 4 from the first position into the second position, (according to the first specific embodiment of the charging device) interface device 4 is removed from housing 2 of charging device 1, rotated 180° about axis N, and reattached to housing 2 of charging device 1. In the first and second positions, interface device 4 is situated at the same location in housing 2 of charging device 1, but in the first and second positions, interface device 4 is positioned in different orientations (rotated 180° about axis N) with respect to housing 2 of charging device 1. As described below with reference to the further exemplary embodiments of charging device 1, interface device 4 may be moved or brought from the first position into the second position in different ways.

As shown in FIG. 2, interface device 4 in the second position is oriented in such a way that the five connecting elements 18a, 18b, 18c, 18d, 18e of second terminal point 16 are connected to the five connecting lines 19a, 19b, 19c, 19d, 19e of control device 3. Thus, in the second position, in second terminal point 16 there is a connection of the five terminal elements 16a, 16b, 16c, 16d, 16e to control device 3 via the five connecting elements 18a, 18b, 18c, 18d, 18e, so that a rechargeable battery connected to the five terminal elements 16a, 16b, 16c, 16d, 16e may be supplied with voltage via control device 3.

As illustrated in FIGS. 1 and 2, first microswitch 5 and second microswitch 6 are positioned in housing 2 of charging device 1 in such a way that interface device 4 activates first microswitch 5 when interface device 4 is in the first position, and activates second microswitch 6 when interface device 4 is in the second position. As a result of the particular activation of first or second microswitch 5, 6, charging device 1 recognizes whether interface device 4 is in the first or second position. First and second microswitches 5, 6 are hereby appropriately connected to control device 3.

In addition, charging device 1 also recognizes, based on the number of connections between terminal elements 15a, 15b, 15c, 15d, 16a, 16b, 16c, 16d, 16e and connecting elements 17a, 17b, 17c, 17d, 17e, 18a, 18b, 18c, 18d, 18e, whether interface device 4 is in the first or second position. For this purpose, charging device 1 recognizes that middle connecting element 17c has no connection to a connecting element 15a, 15b, 15c, 15d of first terminal point 15 in the first position of interface device 4 (see FIG. 1). Due to the connection of the four connecting elements 17a, 17b, 17d, 17e to the four terminal elements 15a, 15b, 15c, 15d, and due to "free" (i.e., not connected) fifth connecting element 17c, control device 3 recognizes that interface device 4 is in the first position, and that a first rechargeable battery is or may be connected to interface device 4. When control device 3 recognizes that interface device 4 is in the first position, a first charging configuration for charging the first rechargeable battery is selected in control device 3.

Figure 3:
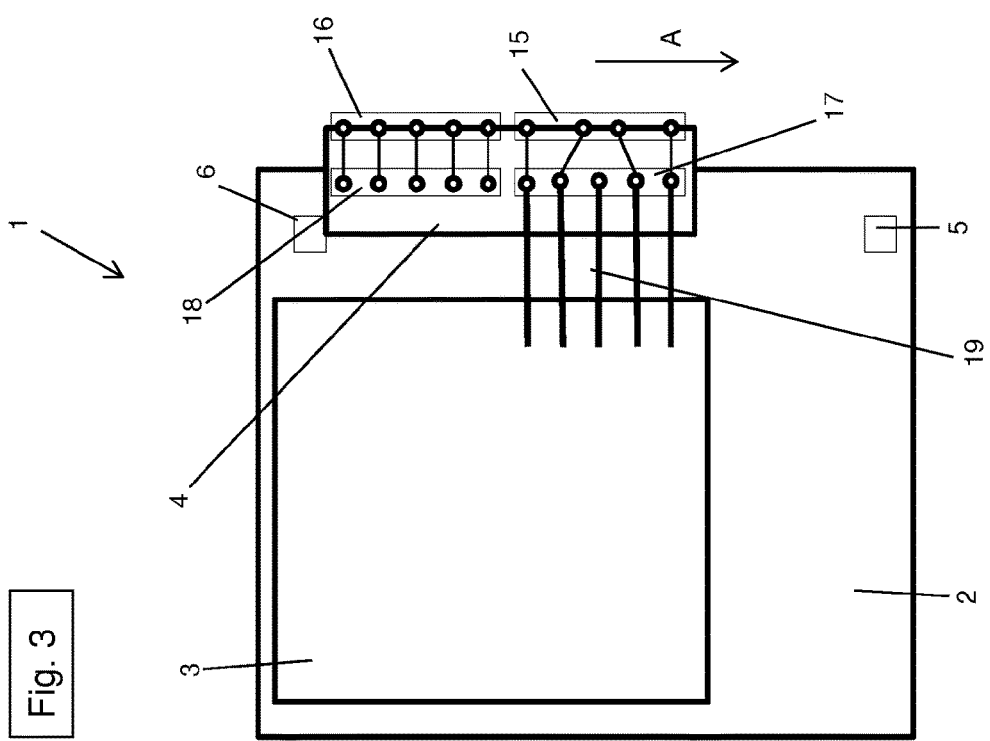
FIG. 3 shows a schematic view of the charging device according to the present invention according to a second specific embodiment, with the interface device in a first position.

FIGS. 3 and 4 illustrate a second specific embodiment of charging device 1. Charging device 1 according to the second specific embodiment is essentially identical to charging device 1 according to the first specific embodiment. In FIG. 3, interface device 4 is in the first position, and in FIG. 4, interface device 4 is in the second position. In contrast to the first specific embodiment, charging device 1 according to the second specific embodiment is configured in such a way that interface device 4 may be reversibly brought from the first position into the second position by a displacement. For changing interface device 4 from the first position into the second position, interface device 4 is moved in direction A relative to housing 2 of charging device 1 (see FIG. 3). For returning interface device 4 from the second position into the first position, interface device 4 is moved in direction B relative to housing 2 of charging device 1 (see FIG. 4).

Figure 6:
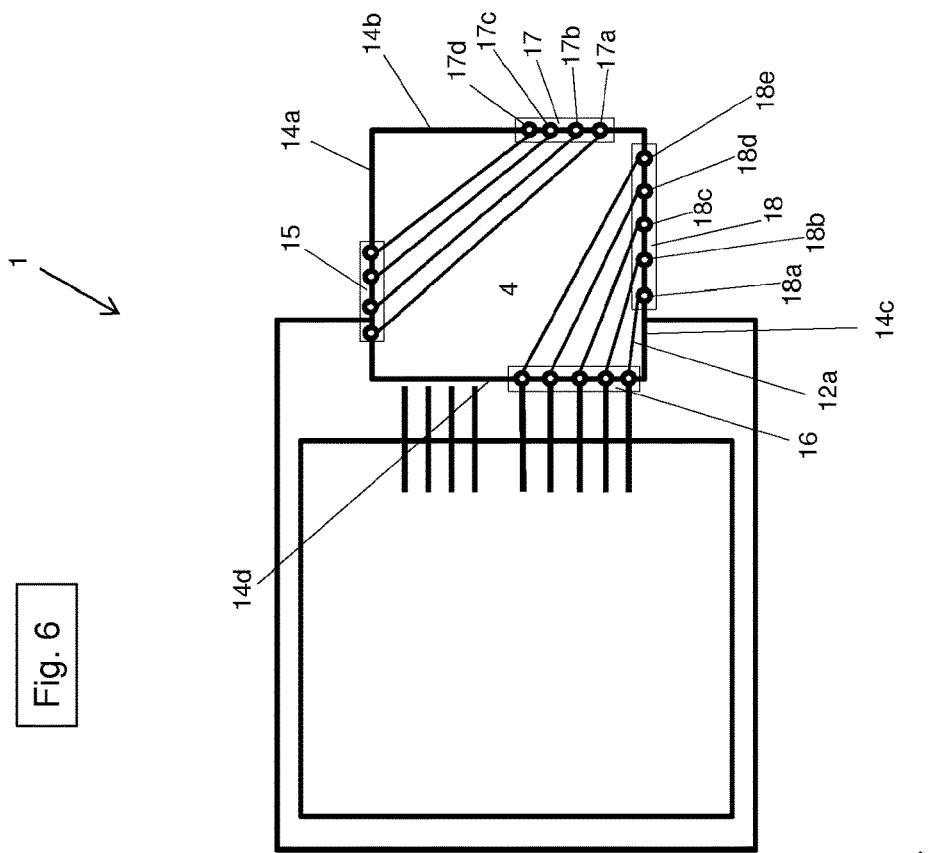
FIG. 6 shows a schematic view of the charging device according to the present invention according to the third specific embodiment, with the interface device in a second position.
Figure 5:
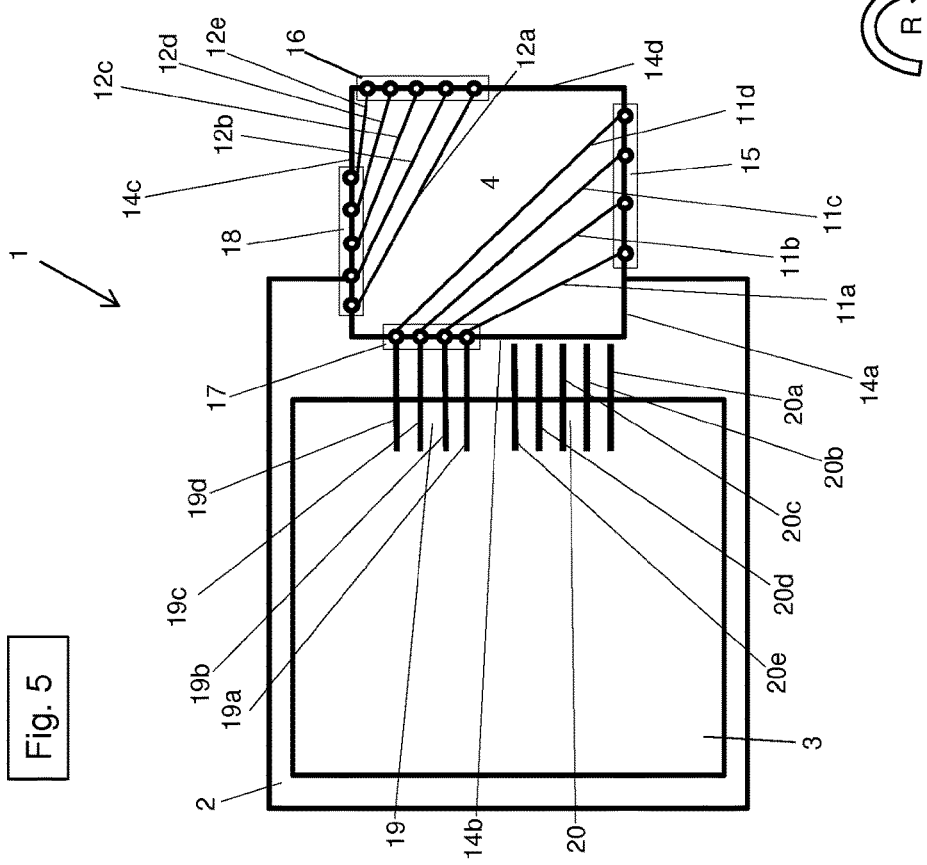
FIG. 5 shows a schematic view of the charging device according to the present invention according to a third specific embodiment, with the interface device in a first position.

FIGS. 5 and 6 illustrate a third specific embodiment of charging device 1. According to the third specific embodiment and in contrast to the first specific embodiment, interface device 4 is designed in the shape of a cube. Only a first side 14*a*, a second side 14*b*, a third side 14*c*, and a fourth side 14*d* are illustrated in Figures and 6. Interface device 4 contains a first terminal point 15, a second terminal point 16, a first connection point 17, and a second connection point 18. As shown in FIG. 5, first terminal point 15 is positioned on first side 14*a* of interface device 4, designed as a cube. First connection point 17 is positioned on second side 14*b* of the cube. Second terminal point 16 is positioned on third side 14*d* of the cube. Second connection point 18 is positioned on third side 14*c* of the cube. First terminal point 15 contains four terminal elements 15*a*, 15*b*, 15*c*, 15*d*, and second terminal point 16 contains five terminal elements 16*a*, 16*b*, 16*c*, 16*d*, 16*e*. First connection point 17 contains four connecting elements 17*a*, 17*b*, 17*c*, 17*d*, and second connection point 18 contains five connecting elements 18*a*, 18*b*, 18*c*, 18*d*, 18*e*. In addition, control device 3 according to the third specific embodiment contains a first connection device 19 and a second connection device 20. First connection device 19 in turn contains four connecting lines 19*a*, 19*b*, 19*c*, 19*d*, and second connection device 20 contains five connecting lines 20*a*, 20*b*, 20*c*, 20*d*, 20*e*. First connection device 19 is used for connecting interface device 4 to control device 3 via first connection point 17. Second connection device 20 is used for connecting interface device 4 to control device 3 via second connection point 18.

FIG. 5 illustrates interface device 4 in the first position, whereby interface device 4, designed as a cube, is oriented with respect to housing 2 of charging device 1 in such a way that first connection point 17 is connected to first connection device 19. The four connecting elements 17*a*, 17*b*, 17*c*, 17*d* of first connection point 17 are connected to the four connecting lines 19*a*, 19*b*, 19*c*, 19*d* of first connection device 19. The four connecting elements 17*a*, 17*b*, 17*c*, 17*d* are connected to the four terminal elements 15*a*, 15*b*, 15*c*, 15*d* via four connecting lines 11*a*, 11*b*, 11*c*, 11*d*. When first connection point 17 is connected to first connection device 19, charging device 1 or control device 3 recognizes that interface device 4 is in the first position, and that a first rechargeable battery is or may be connected to first terminal point 15. As a result, the first charging configuration for charging the first rechargeable battery is selected and set in control device 3.

According to the third specific embodiment of charging device 1, to move interface device 4, designed as a cube, from the first position (FIG. 5) into the second position (FIG. 6), interface device 4 is removed from housing 2 of charging device 1, appropriately rotated by 180° in arrow direction R, and reconnected to housing 2 of charging device 1 (compare FIG. 5 to FIG. 6).

FIG. 6 illustrates interface device 4 in the second position, whereby interface device 4, designed as a cube, is oriented with respect to housing 2 of charging device 1 in such a way that second connection point 17 is connected to second connection device 20. The five connecting elements 18*a*, 18*b*, 18*c*, 18*d*, 18*e* of second connection point 18 are connected to the five connecting lines 20*a*, 20*b*, 20*c*, 20*d*, 20*e* of second connection device 20. The five connecting elements 18*a*, 18*b*, 18*c*, 18*d*, 18*e* are connected to the five terminal elements 16*a*, 16*b*, 16*c*, 16*d*, 16*e* via five connecting lines 12*a*, 12*b*, 12*c*, 12*d*, 12*e*. When second connection point 18 is connected to second connection device 20, charging device 1 or control device 3 recognizes that interface device 4 is in the second position, and that a second rechargeable battery is or may be connected to second terminal point 16. As a result, the second charging configuration for charging the second rechargeable battery is selected and set.

Figure 8:
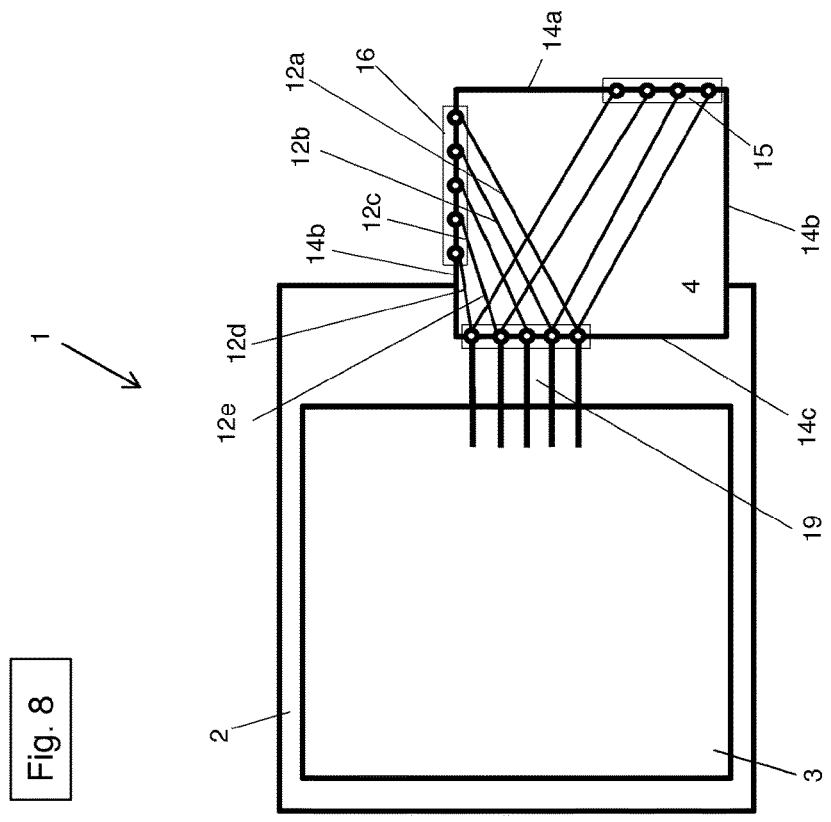
FIG. 8 shows a schematic view of the charging device according to the present invention according to the fourth specific embodiment, with the interface device in a second position.
Figure 7:
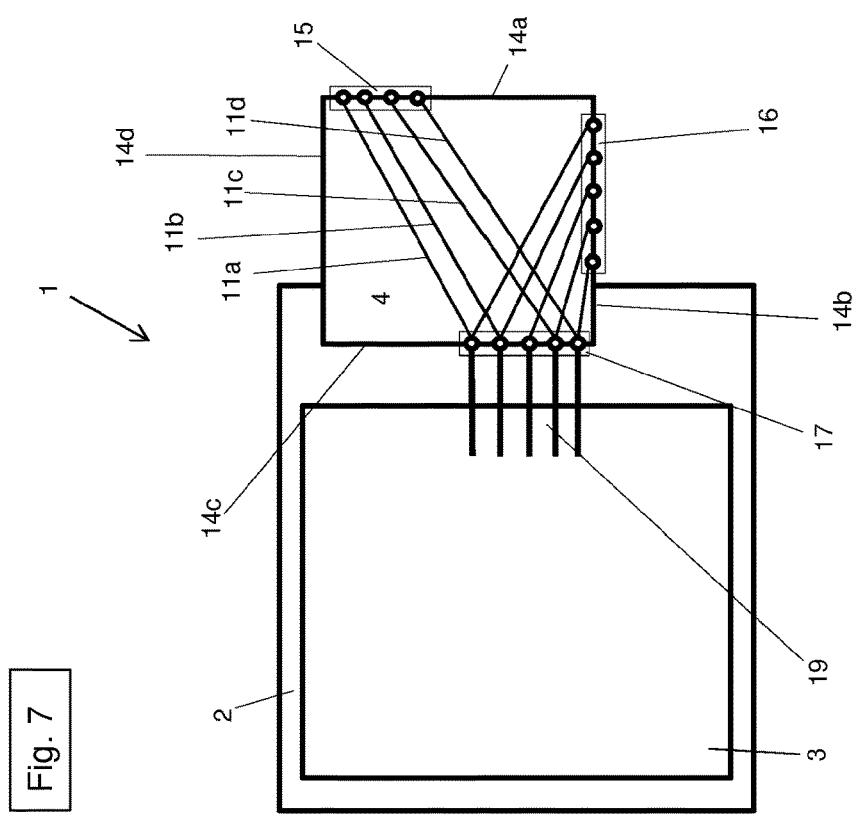
FIG. 7 shows a schematic view of the charging device according to the present invention according to a fourth specific embodiment, with the interface device in a first position.

FIGS. 7 and 8 illustrate a fourth specific embodiment of charging device 1. According to the fourth specific embodiment and in contrast to the first specific embodiment, interface device 4 is likewise designed in the shape of a cube.

Only a first side 14*a*, a second side 14*b*, a third side 14*c*, and a fourth side 14*d* are illustrated in FIGS. 7 and 8. Interface device 4 contains a first terminal point 15, a second terminal point 16, and a connection point 17. As shown in FIG. 7, first terminal point 15 is positioned on first side 14*a* of interface device 4, designed as a cube. Second terminal point 16 is positioned on second side 14*b* of the cube. Connection point 17 is positioned on third side 14*c* of the cube. According to the fourth specific embodiment, charging device 1 includes a control device 3 with only one connection device 19 together with five connecting lines 19*a*, 19*b*, 19*c*, 19*d*, 19*e*. The five connecting lines 19*a*, 19*b*, 19*c*, 19*d*, 19*e* are connected to the five connecting elements 17*a*, 17*b*, 17*c*, 17*d*, 17*e* of connection point 17. The connecting elements 17*a*, 17*b*, 17*c*, 17*d*, 17*e* are in turn connected to the four terminal elements 15*a*, 15*b*, 15*c*, 15*d* of first terminal point 15, and to the five terminal elements 16*a*, 16*b*, 16*c*, 16*d*, 16*e* of second terminal point 16, via corresponding connecting lines 12*a*, 12*b*, 12*c*, 12*d*, 12*e*. FIG. 7 shows interface device 4 in the first position, in which a first rechargeable battery may be connected to first terminal point 15. FIG. 8 shows interface device 4 in the second position, in which a second rechargeable battery may be connected to second terminal point 16. To bring interface device 4 from the first position into the second position, interface device 4 must be detached from housing 2 of charging device 1 in order to be appropriately rotated by 180° and reconnected to housing 2 of charging device 1.

When interface device 4 is in the first position and a first rechargeable battery is connected to first terminal point 15, control device 3 recognizes that the four terminal elements 15*a*, 15*b*, 15*c*, 15*d* of first terminal point 15 are connected to the four contact elements of the first rechargeable battery. Due to the connection of the four terminal elements 15*a*, 15*b*, 15*c*, 15*d* of first terminal point 15 to respective occupied connecting lines 19*a*, 19*b*, 19*c*, 19*d*, 19*e*, control device 3 recognizes that a first rechargeable battery is connected to first terminal point 15. As a result, the first charging configuration for charging the first rechargeable battery is selected and set in control device 3.

When interface device 4 is now in the second position and a second rechargeable battery is connected to second terminal point 16, control device 3 recognizes that the five terminal elements 16*a*, 16*b*, 16*c*, 16*d*, 16*e* of second terminal point 16 are connected to the five contact elements of the second rechargeable battery. Due to the connection of the five terminal elements 16*a*, 16*b*, 16*c*, 16*d*, 16*e* of second terminal point 16 to respective occupied connecting lines 19*a*, 19*b*, 19*c*, 19*d*, 19*e*, control device 3 recognizes that a second rechargeable battery is connected to second terminal point 16. As a result, the second charging configuration for charging the second rechargeable battery is selected and set in control device 3.

FIGS. 9 and 10 illustrate a fifth specific embodiment of charging device 1. The fifth specific embodiment of charging device 1 is essentially identical to the first and second specific embodiments of charging device 1. In contrast to the first and second specific embodiments, interface device 4 is designed in the shape of a cube. Only a first side 14a, a second side 14b, a third side 14c, and a fourth side 14d are illustrated in FIGS. 9 and 10. Control device 3 contains a connection device 19 with five connecting lines 19a, 19b, 19c, 19d, 19e. Interface device 4 contains a first terminal point 15 with four terminal elements 15a, 15b, 15c, 15d and a second terminal point 16 with five terminal elements 16a, 16b, 16c, 16d, 16e. In addition, interface device 4 contains a first connection point 17 with four connecting elements 17a, 17b, 17c, 17d and a second connection point 18 with five connecting elements 18a, 18b, 18c, 18d, 18e. First terminal point 15 is positioned on second side 14b of the cube. Second terminal point 16 is positioned on fourth side 14d of the cube. First connection point 17 is positioned on third side 14c of the cube, and second connection point 18 is positioned on first side 14a of the cube.

FIG. 9 shows interface device 4 in the first position, the four terminal elements 15a, 15b, 15c, 15d of first terminal point 15 being connected to the four connecting elements 17a, 17b, 17c, 17d of first connection point 17 via the four connecting lines 11a, 11b, 11c, 11d. In the first position, only four of the five connecting lines 19a, 19b, 19c, 19d, 19e of connection device 19 are occupied. Connecting line 19c is not occupied. Due to only four of the five connecting lines 19a, 19b, 19c, 19d, 19e being occupied, control device 3 recognizes that interface device 4 is in the first position, and that a first rechargeable battery is or may be connected to first terminal point 15. Based on the recognition of the first position and of the first rechargeable battery, a first charging configuration for charging the first rechargeable battery is selected and set in control device 3.

To change interface device 4 from the first position into the second position, interface device 4 must be detached from housing 2 of charging device 1, rotated by 180° in arrow direction R, and reconnected to housing 2 of charging device 1.

FIG. 10 shows interface device 4 in the second position, the five terminal elements 16a, 16b, 16c, 16d, 16e of second terminal point 16 being connected to the five connecting elements 18a, 18b, 18c, 18d, 18e of second connection point 18 via connecting lines 12a, 12b, 12c, 12d, 12e. In the second position, the five connecting lines 19a, 19b, 19c, 19d, 19e of connection device 19 are occupied. Due to the five connecting lines 19a, 19b, 19c, 19d, 19e being occupied, control device 3 recognizes that interface device 4 is in the second position, and that a second rechargeable battery is or may be connected to second terminal point 16. Based on the recognition of the second position and of the second rechargeable battery, a second charging configuration for charging the second rechargeable battery is selected and set in control device 3.

Figure 12:
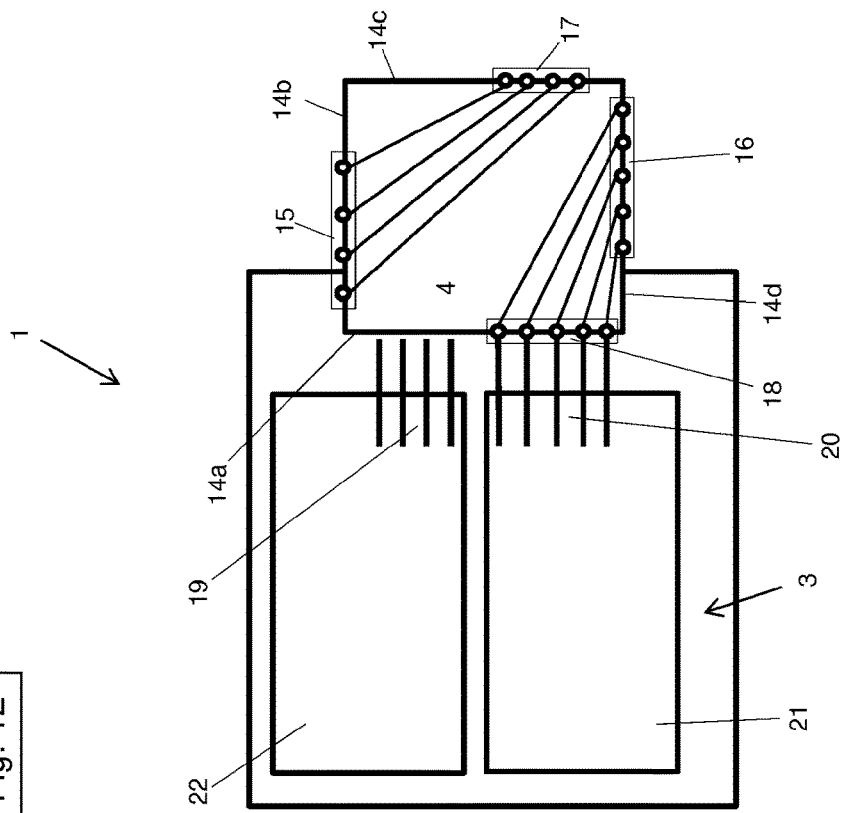
FIG. 12 shows a schematic view of the charging device according to the present invention according to the sixth specific embodiment, with the interface device in a second position.
Figure 11:
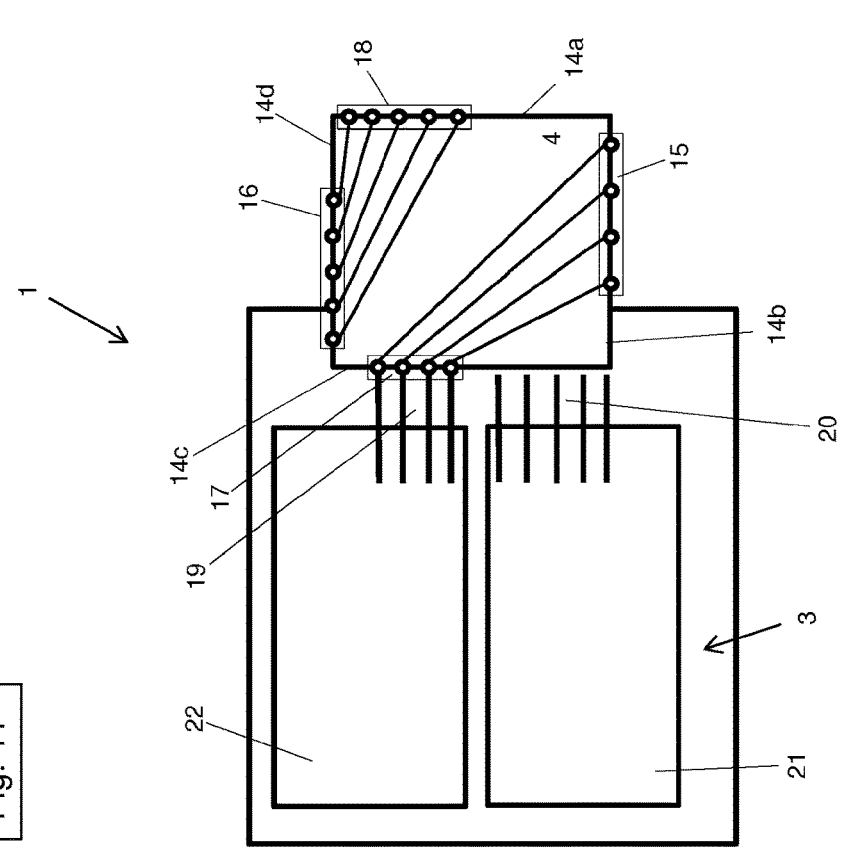
FIG. 11 shows a schematic view of the charging device according to the present invention according to a sixth specific embodiment, with the interface device in a first position.

FIGS. 11 and 12 illustrate a sixth specific embodiment of charging device 1. The sixth specific embodiment of charging device 1 is essentially identical to the fifth specific embodiment of charging device 1. Interface device 4 is designed in the shape of a cube. Only a first side 14a, a second side 14b, a third side 14c, and a fourth side 14d are illustrated in FIGS. 11 and 12.

In contrast to the fifth specific embodiment of charging device 1, control device 3 of charging device 1 according to the sixth specific embodiment contains a first circuit board 21 with a first connection device 19 together with four connecting lines 19a, 19b, 19c, 19d, and a second circuit board 22 with a second connection device 20 together with five connecting lines 20a, 20b, 20c, 20d, 20e. First circuit board 21 contains a first charging configuration for charging a first rechargeable battery, and second circuit board 22 contains a second charging configuration for charging a second rechargeable battery.

Interface device 4 according to the sixth specific embodiment is identical to interface device 4 according to the fifth specific embodiment.

First connection device 19 is used for connecting first circuit board 21 to first connection point 17, and second connection device 20 is used for connecting second circuit board 22 to second connection point 18. The four connecting elements 17a, 17b, 17c, 17d of first connection point 17 are connected to the four terminal elements 15a, 15b, 15c, 15d of first terminal point 15 via the four connecting lines 11a, 11b, 11c, 11d. The five connecting elements 18a, 18b, 18c, 18d, 18e of second connection point 18 are connected to the five terminal elements 16a, 16b, 16c, 16d, 16e of second terminal point 16 via the five connecting lines 12a, 12b, 12c, 12d, 12e.

When interface device 4 is in the first position (see FIG. 11), the four connecting lines 19a, 19b, 19c, 19d of first connection device 19 are connected to the four connecting elements 17a, 17b, 17c, 17d of first connection point 17. The four connecting elements 17a, 17b, 17c, 17d are connected to the four terminal elements 15a, 15b, 15c, 15d of first terminal point 15 via the four connecting lines 11a, 11b, 11c, 11d. A first rechargeable battery may now be connected to first terminal point 15. When interface device 4 is in the first position, due to the four connecting lines 19a, 19b, 19c, 19d being occupied by the four connecting elements 17a, 17b, 17c, 17d of first connection point 17, first circuit board 21 recognizes that interface device 4 is set in the first position, and that a first rechargeable battery is or may be connected to first terminal point 15. As a result, the first charging configuration for charging the first rechargeable battery is activated in first circuit board 21 of control device 3.

According to the sixth specific embodiment of charging device 1, to move interface device 4, designed as a cube, from the first position (FIG. 11) into the second position (FIG. 12), interface device 4 is removed from housing 2 of charging device 1, appropriately rotated by 180° in arrow direction R, and reconnected to housing 2 of charging device 1 (compare FIG. 11 to FIG. 12).

When interface device 4 is now in the second position (see FIG. 12), the five connecting lines 20a, 20b, 20c, 20d, 20e of second connection device 20 are connected to the five connecting elements 18a, 18b, 18c, 18d, 18e of second connection point 18. The five connecting elements 17a, 17b, 17c, 17d, 17e are connected to the five terminal elements 16a, 16b, 16c, 16d, 16e of second terminal point 16 via five connecting lines 12a, 12b, 12c, 12d, 12e. A second rechargeable battery may now be connected to second terminal point 16. When interface device 4 is in the second position, second circuit board 22, based on the five connecting lines 20a, 20b, 20c, 20d, 20e being occupied by the five connecting elements 18a, 18b, 18c, 18d, 18e of second connection point 18, recognizes that interface device 4 is set in the second position, and that a second rechargeable battery is or may be connected to second terminal point 16. As a result, the second charging configuration for charging the second rechargeable battery is activated in second circuit board 22 of control device 3.

According to further specific embodiments which are not illustrated in the figures or described in greater detail, it is possible for interface device 4 of charging device 1 according to the third through sixth specific embodiments (see FIGS. 5 through 12) to be designed not in the shape of a cube, but, rather, in any other suitable shape.

Figure 15:
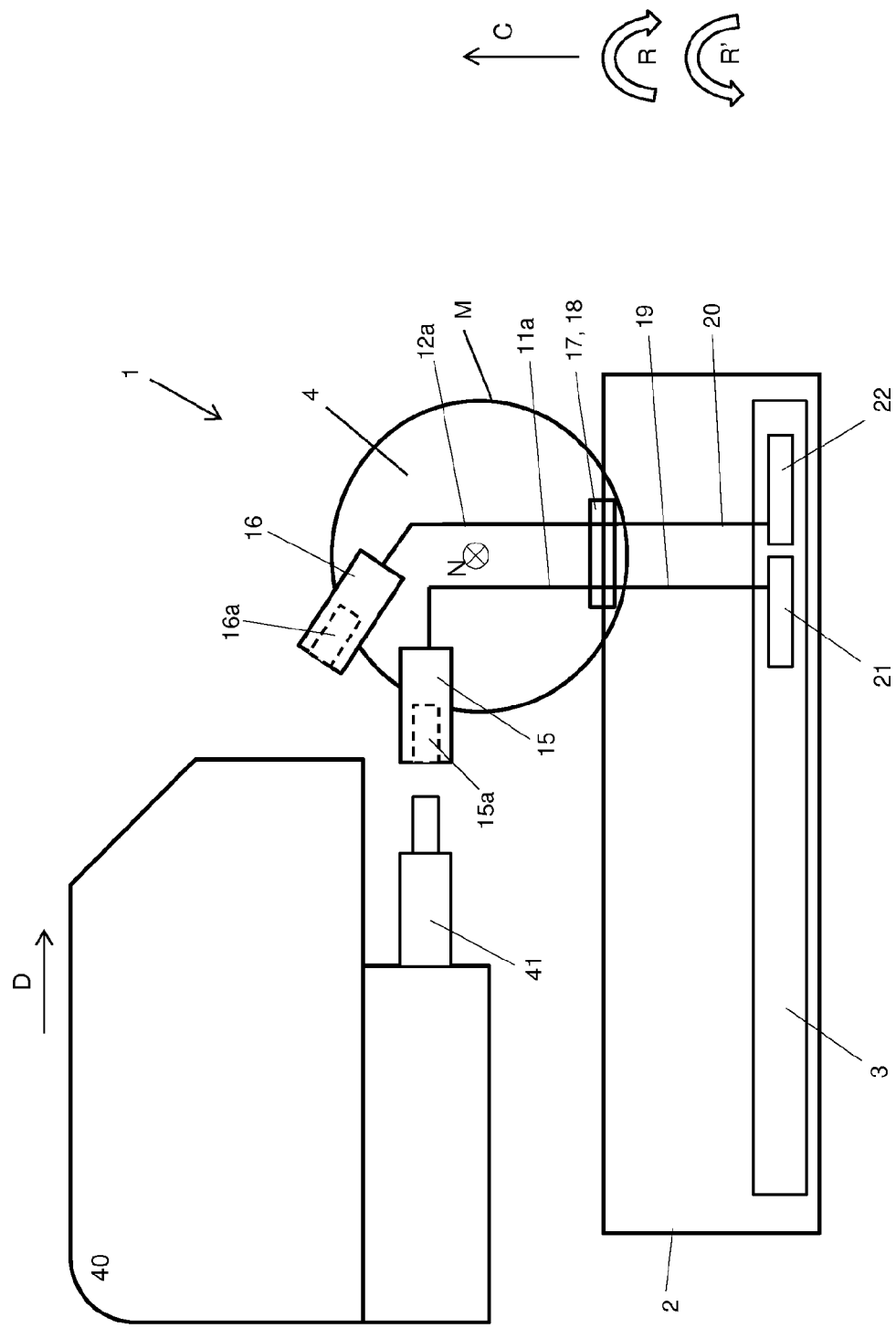
FIG. 15 shows a side view of the charging device according to the present invention according to the seventh specific embodiment, with the interface device in a second position, and a second rechargeable battery.
Figure 16:
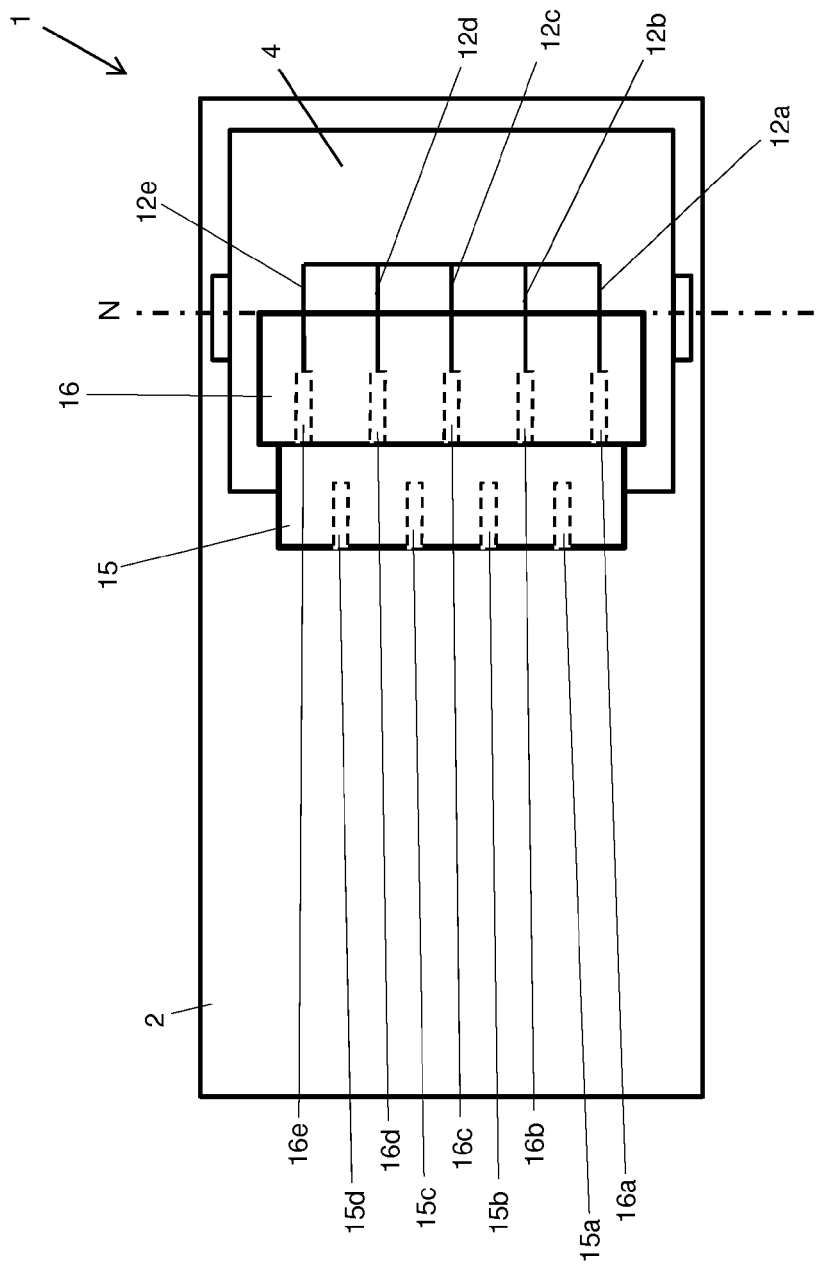
FIG. 16 shows a top view onto the charging device according to the present invention according to the seventh specific embodiment, with the interface device in a second position.

FIGS. 13, 14, 15, and 16 illustrate a seventh specific embodiment of charging device 1, which is essentially identical to the sixth specific embodiment of charging device 1. In FIG. 13, charging device 1 according to the seventh specific embodiment is shown, together with a first rechargeable battery 30. In FIG. 15, charging device 1 according to the seventh specific embodiment is shown, together with a second rechargeable battery 40.

According to the seventh specific embodiment and in contrast to the sixth specific embodiment, interface device 4 has a cylindrical shape with an essentially circular cross-sectional area.

Interface device 4 is reversible from the first position (FIGS. 13, 14) to the second position (FIGS. 15, 16), and is pivotable about axis P in direction R or R' relative to housing 2 of charging device 1. First terminal point 15 and second terminal point 16 are positioned on circumferential surface M of interface device 4, designed as a cylinder, in such a way that first terminal point 15 is situated below second terminal point 16 in direction C.

The connection of first terminal point 15 to first circuit board 21 of control device 3 via the four connecting lines 17a, 17b, 17c, 17d and four connecting lines 19a, 19b, 19c, 19d, and the connection of second terminal point 16 to second circuit board 22 of control device 3 via the five connecting lines 18a, 18b, 18c, 18d, 18e and five connecting lines 20a, 20b, 20c, 20d, 20e, correspond to the design in FIGS. 11 and 12.

To connect a contact point 31 of first rechargeable battery 30 to first terminal point 15 of interface device 4, interface device 4 is moved into the first position, and first rechargeable battery 30 is moved in direction D toward interface device 4 (see FIG. 13). When contact point 31 of first rechargeable battery 30 is connected to first terminal point 15, the first charging configuration for charging first rechargeable battery 30 is activated in first circuit board 21 of control device 3.

In contrast, to connect a contact point 41 of second rechargeable battery 40 to second terminal point 16 of interface device 4, interface device 4 is moved into the second position, and second rechargeable battery 40 is moved in direction D toward interface device 4 (see FIG. 15). When contact point 41 of second rechargeable battery 40 is connected to second terminal point 16, the second charging configuration for charging second rechargeable battery 40 is activated in second circuit board 22 of control device 3.

Figure 17:
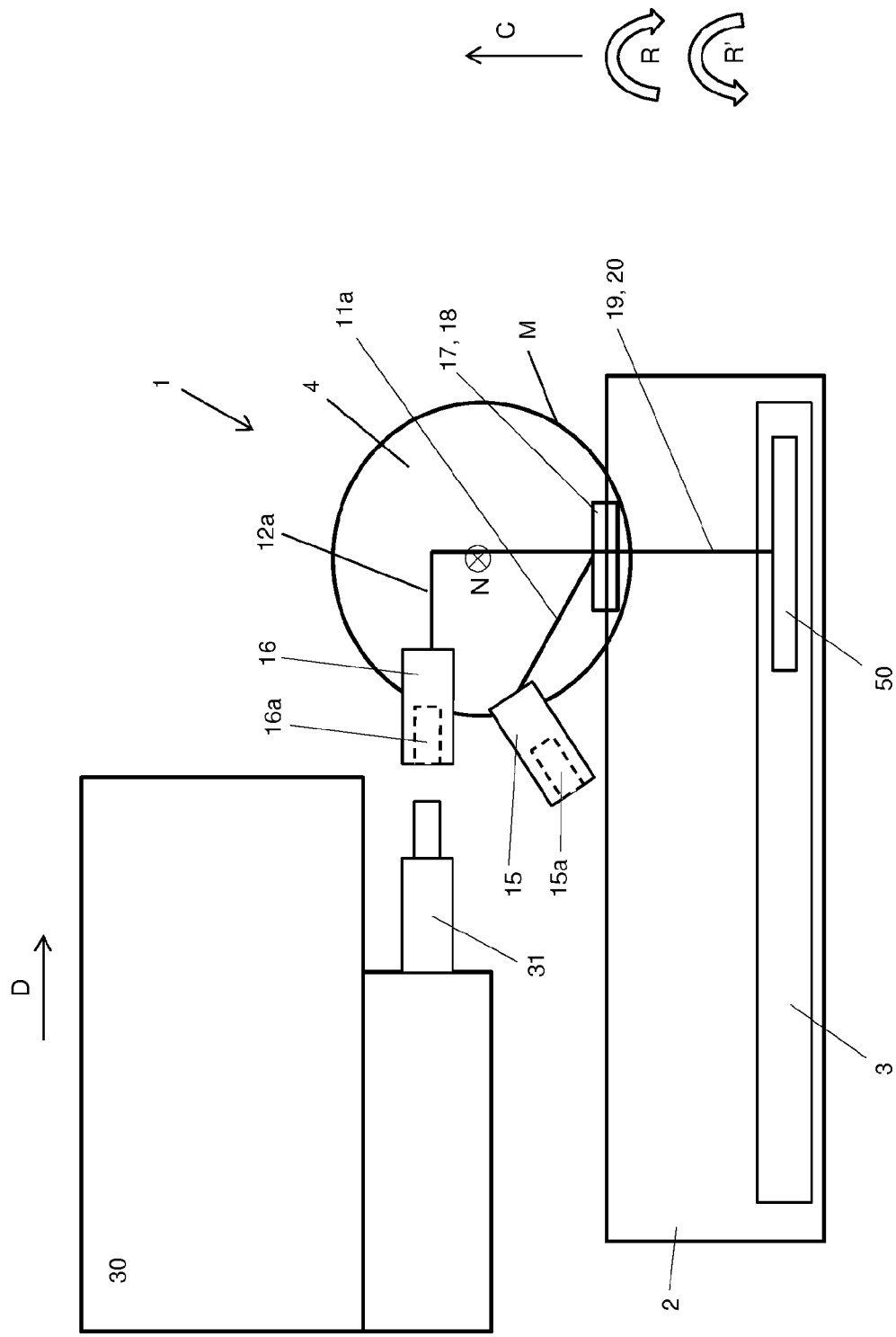
FIG. 17 shows a side view of the charging device according to the present invention according to an eighth specific embodiment, with the interface device in a first position, and a first rechargeable battery.

FIGS. 17 and 18 illustrate an eighth specific embodiment of charging device 1, which is essentially identical to the fourth specific embodiment of charging device 1. In FIG. 17, charging device 1 according to the eighth specific embodiment is shown, together with a first rechargeable battery 30. In FIG. 18, charging device 1 according to the eighth specific embodiment is shown, together with a second rechargeable battery 40.

The design of charging device 1 and of interface device 4 according to the eighth specific embodiment essentially corresponds to the design of charging device 1 and of interface device 4 according to the seventh specific embodiment (see FIGS. 13, 14, 15, and 16). In contrast to the sixth specific embodiment, charging device 1 contains only one connection device 20, together with five connecting lines 20a, 20b, 20c, 20d, 20e for connecting interface device 4 to control device 3.

To connect contact point 31 of first rechargeable battery 30 to first terminal point 15 of interface device 4, interface device 4 is moved into the first position, and first rechargeable battery 30 is moved in direction D toward interface device 4 (see FIG. 17). When contact point 31 of first rechargeable battery 30 is connected to terminal point 15, the first charging configuration for charging first rechargeable battery 30 is activated in circuit board 50 of control device 3.

In contrast, to connect contact point 41 of second rechargeable battery 40 to second terminal point 16 of interface device 4, interface device 4 is moved into the second position, and second rechargeable battery 40 is moved in direction D toward interface device 4 (see FIG. 18). When contact point 41 of second rechargeable battery 40 is connected to second terminal point 16, the second charging configuration for charging second rechargeable battery 40 is activated in circuit board 50 of control device 3.

The activation of the first or second charging configuration for charging first or second rechargeable battery 30, 40 takes place after control device 3 recognizes that first or second rechargeable battery 30, 40 is connected to first or second terminal point 15, 16. The recognition takes place based on the setting of interface device 4 in the first or second position with the aid of a microswitch, not shown.

Alternatively, the recognition takes place based on the transmission of a piece of information or data set via one of connecting lines 11a, 11b, 11c, 11d, 12a, 12b, 12c, 12d, 12e and connecting lines 20a, 20b, 20c, 20d, 20e from the particular rechargeable battery 30, 40 to control device 3. The particular first or second rechargeable battery 30, 40 transmits an identifier to control device 3 for identification of the rechargeable battery.

Alternatively, the recognition takes place based on the number of particular occupied connecting lines 20a, 20b, 20c, 20d, 20e; only four connecting lines 20a, 20b, 20d, 20e are occupied when first rechargeable battery 30 is connected to first terminal point 15, whereas five connecting lines 20a, 20b, 20c, 20d, 20e are occupied when second rechargeable battery 40 is connected to second terminal point 16. The occupation of connecting lines 20a, 20b, 20c, 20d, 20e is recognized by control device 3, as the result of which the first charging configuration or the second charging configuration for charging the first rechargeable battery 30 or second rechargeable battery 40 is appropriately activated.

What is claimed is:

1. A charging device for charging at least one rechargeable battery, the charging device comprising:
   a control device; and
   at least one electromechanical interface device for connecting at least one rechargeable battery to the charging device and for supplying the rechargeable battery with a voltage, the interface device including at least one first terminal point and one second terminal point, the interface device being settable in at least one first position and one second position, the first terminal point being usable for charging a first rechargeable battery when the interface device is set in the first position, and the second terminal point being usable for charging a second rechargeable battery when the interface device is set in the second position;
   wherein at least one first terminal element of the first terminal point and at least one second terminal element of the second terminal point are configured to receive information concerning the first rechargeable battery and the second rechargeable battery at the charging device, and configured to, depending on the particular first or second rechargeable battery connected, set a first charging configuration for charging the first rechargeable battery, or to set a second charging configuration for charging the second rechargeable battery;

the control device recognizing that the interface device is in the first or the second position based upon a connection of the first terminal point or the second terminal point to the control device and setting the first charging configuration when the interface device is in the first position and the second charging configuration when the interface device is in the second position.

2. The charging device as recited in claim 1 wherein the first terminal point contains a first number of terminal elements and the second terminal point contains a second number of terminal elements, the first number of terminal elements corresponding to a first rechargeable battery contact element number of contact elements of the first rechargeable battery, and the second number of terminal elements corresponding to a second rechargeable battery contact element number of contact elements of the second rechargeable battery.

3. The charging device as recited in claim 1 wherein the s-first charging configuration for charging the first rechargeable battery is selected when the interface device is set in the first position and the first rechargeable battery is connected to the first terminal point, and the second charging configuration for charging the second rechargeable battery is selected when the interface device is set in the second position and the second rechargeable battery is connected to the second terminal point.

4. The charging device as recited in claim 1 wherein the interface device contains a connection point with a number of connecting elements for connecting the interface device to the control device, the number of connecting elements corresponding to a larger number of terminal elements of the first or second terminal point.

5. The charging device as recited in claim 2 wherein the interface device contains a first connection point and a second connection point for connecting the interface device to the control device, the first connection point containing a first number of connecting elements and the second connection point containing a second number of connecting elements, the first number of connecting elements corresponding to the first number of terminal elements, and the second number of connecting elements corresponding to the second number of terminal elements.

6. The charging device as recited in claim 1 wherein the first or second position of the interface device, or the first or second rechargeable battery connected to the interface device, is recognizable based on a number of connections between terminal elements of the terminal points and connecting elements of a connection point of the interface device.

7. The charging device as recited in claim 1 further comprising at least one microswitch for recognizing whether the interface device is set in the first position or in the second position.

8. The charging device as recited in claim 1 wherein the interface device is removable from the control device.

9. A charging device for charging at least one rechargeable battery, the charging device comprising:
a control device; and
at least one electromechanical interface device for connecting at least one rechargeable battery to the charging device and for supplying the rechargeable battery with a voltage, the interface device including at least one first terminal point and one second terminal point, the interface device being settable in at least one first position and one second position, the first terminal point being usable for charging a first rechargeable battery when the interface device is set in the first position, and the second terminal point being usable for charging a second rechargeable battery when the interface device is set in the second position, the interface device being movable with respect to the control device to allow removal and reattachment;

the control device recognizing that the interface device is in the first or the second position based upon a connection of the first terminal point or the second terminal point to the control device and setting a first charging configuration when the interface device is in the first position and a second charging configuration when the interface device is in the second position.

10. The charging device as recited in claim 9 wherein the first terminal point contains a first number of terminal elements and the second terminal point contains a second number of terminal elements, the first number of terminal elements corresponding to a first rechargeable battery contact element number of contact elements of the first rechargeable battery, and the second number of terminal elements corresponding to a second rechargeable battery contact element number of contact elements of the second rechargeable battery.

11. The charging device as recited in claim 9 wherein a first charging configuration for charging the first rechargeable battery is selected when the interface device is set in the first position and the first rechargeable battery is connected to the first terminal point, and a second charging configuration for charging the second rechargeable battery is selected when the interface device is set in the second position and the second rechargeable battery is connected to the second terminal point.

12. The charging device as recited in claim 9 wherein the interface device contains a connection point with a number of connecting elements for connecting the interface device to the control device, the number of connecting elements corresponding to a larger number of terminal elements of the first or second terminal point.

13. The charging device as recited in claim 10 wherein the interface device contains a first connection point and a second connection point for connecting the interface device to the control device, the first connection point containing a first number of connecting elements and the second connection point containing a second number of connecting elements, the first number of connecting elements corresponding to the first number of terminal elements, and the second number of connecting elements corresponding to the second number of terminal elements.

14. The charging device as recited in claim 9 wherein the first or second position of the interface device, or the first or second rechargeable battery connected to the interface device, is recognizable based on a number of connections between terminal elements of the terminal points and connecting elements of a connection point of the interface device.

15. The charging device as recited in claim 9 further comprising at least one microswitch for recognizing whether the interface device is set in the first position or in the second position.

16. The charging device as recited in claim 9 wherein the interface device has a first position with respect to the control device and a second position oriented 180 degrees from the first position about an axis N in a plane of the interface device and dividing the first and second terminal points.

17. A charging device for charging at least one rechargeable battery, the charging device comprising:

a control device; and at least one electromechanical interface device for connecting at least one rechargeable battery to the charging device and for supplying the rechargeable battery with a voltage, the interface device including at least one first terminal point and one second terminal point, the interface device being settable in at least one first position and one second position, the first terminal point being usable for charging a first rechargeable battery when the interface device is set in the first position, and the second terminal point being usable for charging a second rechargeable battery when the interface device is set in the second position, the interface device being movable with respect to the control device and having a first position connected to the control device and a second position oriented differently from the first position;

the control device recognizing that the interface device is in the first or the second position based upon a connection of the first terminal point or the second terminal point to the control device and setting a first charging configuration when the interface device is in the first position and a second charging configuration when the interface device is in the second position.

18. The charging device as recited in claim 17 wherein the first position is oriented 180 degrees from the second position about an axis N in a plane of the interface device and dividing the first and second terminal points.

\* \* \* \* \*